(12) United States Patent
Mobley et al.

(10) Patent No.: US 9,744,911 B2
(45) Date of Patent: Aug. 29, 2017

(54) ATV AND FOUR-WHEELER RACK EXTENSION

(71) Applicants: Roy Mobley, Culver, OR (US); Shawna Mobley, Culver, OR (US)

(72) Inventors: Roy Mobley, Culver, OR (US); Shawna Mobley, Culver, OR (US)

( * ) Notice: Subject to any disclaimer, the term of this patent is extended or adjusted under 35 U.S.C. 154(b) by 135 days.

(21) Appl. No.: 14/829,110

(22) Filed: Aug. 18, 2015

(65) Prior Publication Data
US 2017/0050578 A1    Feb. 23, 2017

(51) Int. Cl.
| B60R 11/00 | (2006.01) |
| B60R 9/00 | (2006.01) |
| B60R 9/06 | (2006.01) |
| B62J 7/04 | (2006.01) |

(52) U.S. Cl.
CPC .. B60R 9/06 (2013.01); B62J 7/04 (2013.01)

(58) Field of Classification Search
CPC .. B60R 9/06; B60R 9/065; B60R 9/10; B60R 9/058; B60R 9/052
USPC ........................................................ 224/492
See application file for complete search history.

(56) References Cited

U.S. PATENT DOCUMENTS

| 4,176,771 | A | * | 12/1979 | Dubroc, Sr. | ............... | B62J 7/04 |
| | | | | | | 224/401 |
| 4,247,030 | A | * | 1/1981 | Amacker | ................. | B60R 9/00 |
| | | | | | | 180/210 |
| 5,685,468 | A | * | 11/1997 | Hernandez | ............. | B60R 11/06 |
| | | | | | | 108/44 |
| 6,378,748 | B1 | * | 4/2002 | Cox | ......................... | B60R 9/06 |
| | | | | | | 224/401 |
| 6,540,124 | B1 | * | 4/2003 | Thomas, Jr. | ............. | B60R 9/00 |
| | | | | | | 224/492 |
| 7,229,090 | B2 | * | 6/2007 | Cumbie | .................. | B60D 1/00 |
| | | | | | | 280/491.3 |
| 7,334,713 | B1 | | 2/2008 | Turner | | |
| 7,854,460 | B2 | | 12/2010 | Tweet | | |
| 8,474,561 | B2 | * | 7/2013 | Allingham | ............... | B60R 9/06 |
| | | | | | | 180/89.11 |
| D713,775 | S | | 9/2014 | Lagermann | | |
| 2002/0148867 | A1 | * | 10/2002 | Savant | ..................... | B60R 9/06 |
| | | | | | | 224/401 |
| 2003/0111501 | A1 | | 6/2003 | McGraw | | |
| 2003/0230607 | A1 | * | 12/2003 | Tweet | ...................... | B60P 3/14 |
| | | | | | | 224/401 |
| 2004/0164112 | A1 | * | 8/2004 | McClain | .................. | B60R 9/08 |
| | | | | | | 224/401 |
| 2005/0205628 | A1 | | 9/2005 | Lehmann | | |

(Continued)

FOREIGN PATENT DOCUMENTS

CN    102529828    7/2012

*Primary Examiner* — Derek Battisti

(57) ABSTRACT

The ATV and four-wheeler rack extension is a device that is adapted to be positioned onto a rear of an ATV or four-wheeler in order to extend the surface area of a rack on said vehicle. The ATV and four-wheeler rack extension includes a rack extension frame that includes a grate member thereon. Both the rack extension frame and the grate member are adapted to be positioned adjacent to and to a rear of a rack of an ATV or four-wheeler. The rack extension frame includes a pair of vertical rack members that extend downwardly. A pair of first diagonal members extend downwardly at an angle from the rack extension member, and are adapted to be secured to a vehicle frame.

5 Claims, 5 Drawing Sheets

(56) References Cited

U.S. PATENT DOCUMENTS

2011/0259931 A1* 10/2011 Rellergert ............... B60R 7/08
                                                            224/401
2013/0076015 A1    3/2013 Lovett

* cited by examiner

ATV AND FOUR-WHEELER RACK EXTENSION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of ATVs and four-wheelers, more specifically, a device that is adapted to attach onto a rear of said vehicle as an extension for the existing rack of said vehicle.

SUMMARY OF INVENTION

The ATV and four-wheeler rack extension is a device that is adapted to be positioned onto a rear of an ATV or four-wheeler in order to extend the surface area of a rack on said vehicle. The ATV and four-wheeler rack extension includes a rack extension frame that includes a grate member thereon. Both the rack extension frame and the grate member are adapted to be positioned adjacent to and to a rear of a rack of an ATV or four-wheeler. The rack extension frame includes a pair of vertical rack members that extend downwardly. A pair of first diagonal members extends downwardly at an angle from the rack extension member. The pair of first diagonal members is each further defined with a first diagonal distal end. A pair of second diagonal members is rigidly affixed to the first diagonal distal ends of the pair of first diagonal members. Fasteners are adapted to secure the pair of second diagonal members to a vehicle frame via the first holes. A pair of horizontal members is rigidly affixed to the first diagonal members and the vertical rack members. The pair of horizontal members each attach to a pair of third diagonal members. The pair of third diagonal members each includes a second hole that is adapted to be secured to the vehicle frame via fasteners.

These together with additional objects, features and advantages of the ATV and four-wheeler rack extension will be readily apparent to those of ordinary skill in the art upon reading the following detailed description of the presently preferred, but nonetheless illustrative, embodiments when taken in conjunction with the accompanying drawings.

In this respect, before explaining the current embodiments of the ATV and four-wheeler rack extension in detail, it is to be understood that the ATV and four-wheeler rack extension is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ATV and four-wheeler rack extension.

It is therefore important that the claims be regarded as including such equivalent construction insofar as they do not depart from the spirit and scope of the ATV and four-wheeler rack extension. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
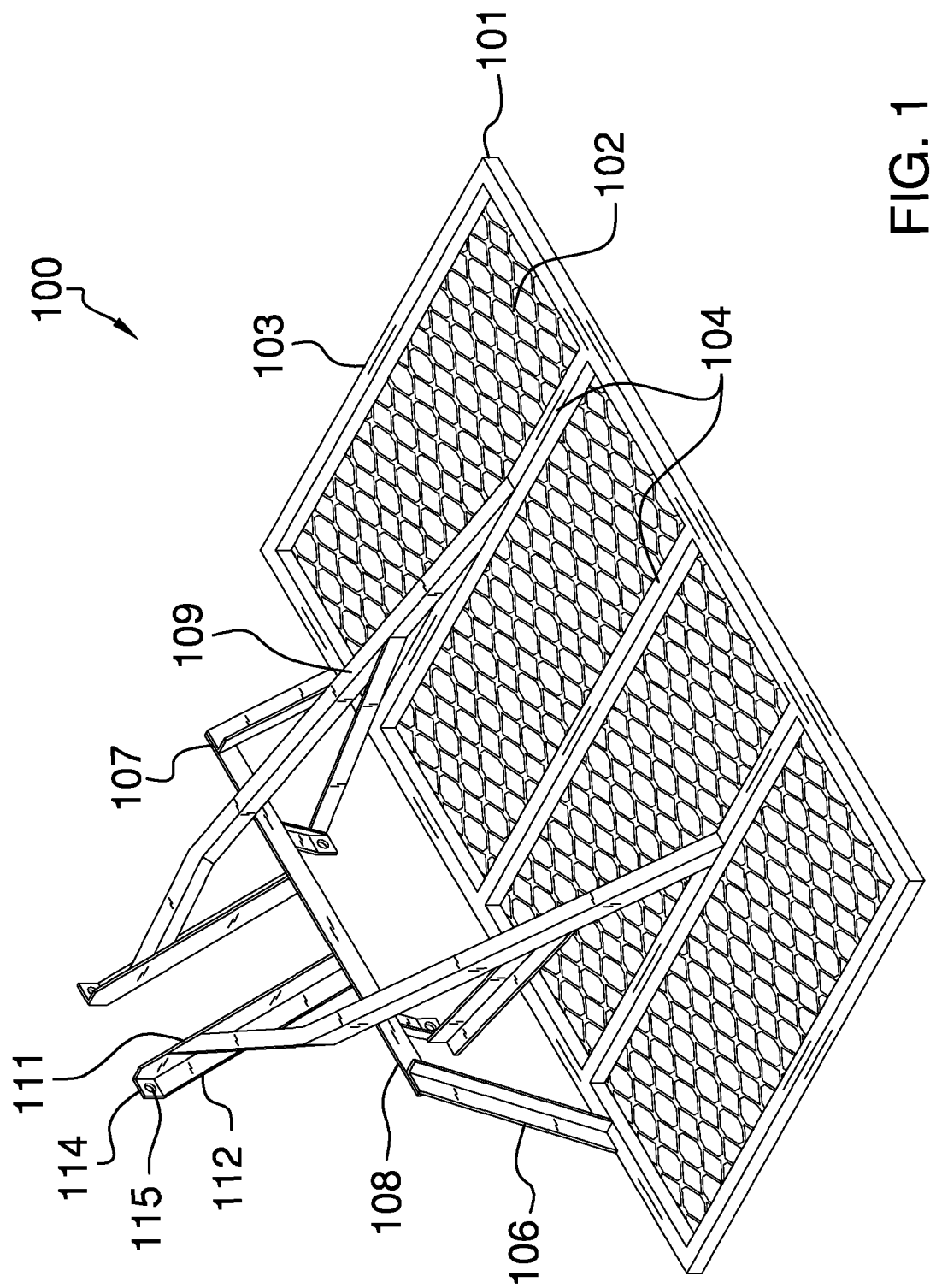
FIG. 1 is a bottom, perspective view of an embodiment of the disclosure.
Figure 2:
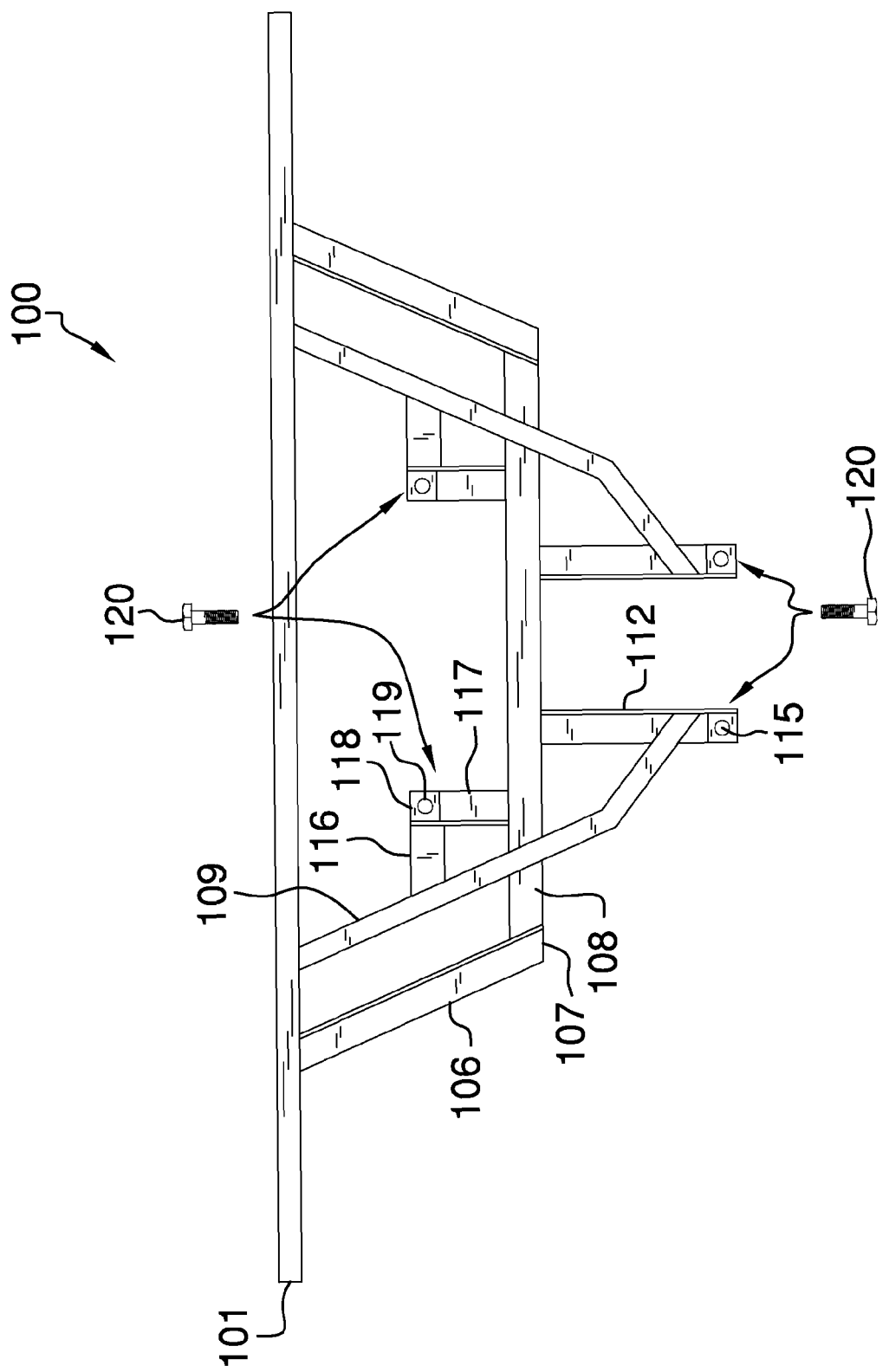
FIG. 2 is a front view of an embodiment of the disclosure.
Figure 3:
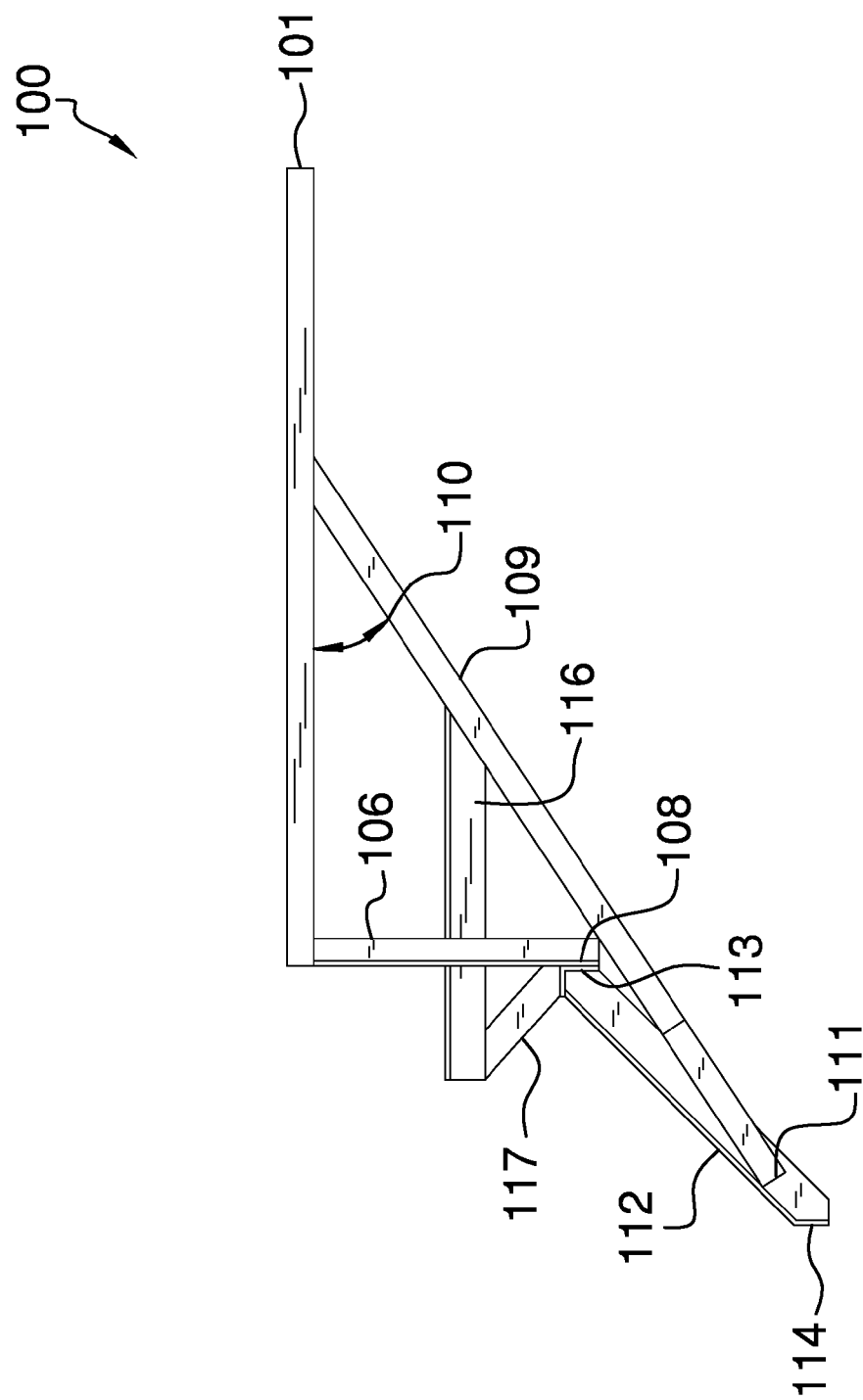
FIG. 3 is a side view of an embodiment of the disclosure.
Figure 4:
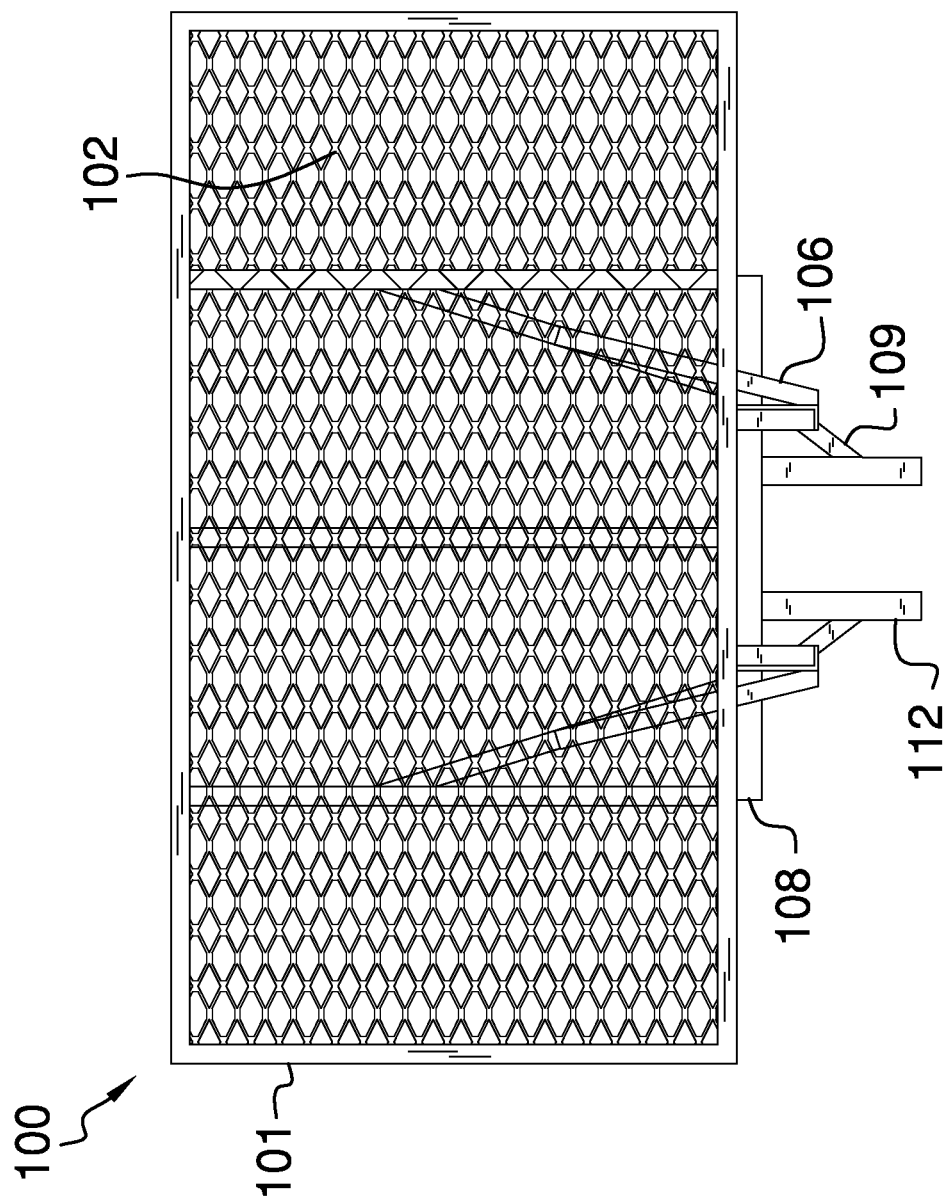
FIG. 4 is a top view of an embodiment of the disclosure.
Figure 5:
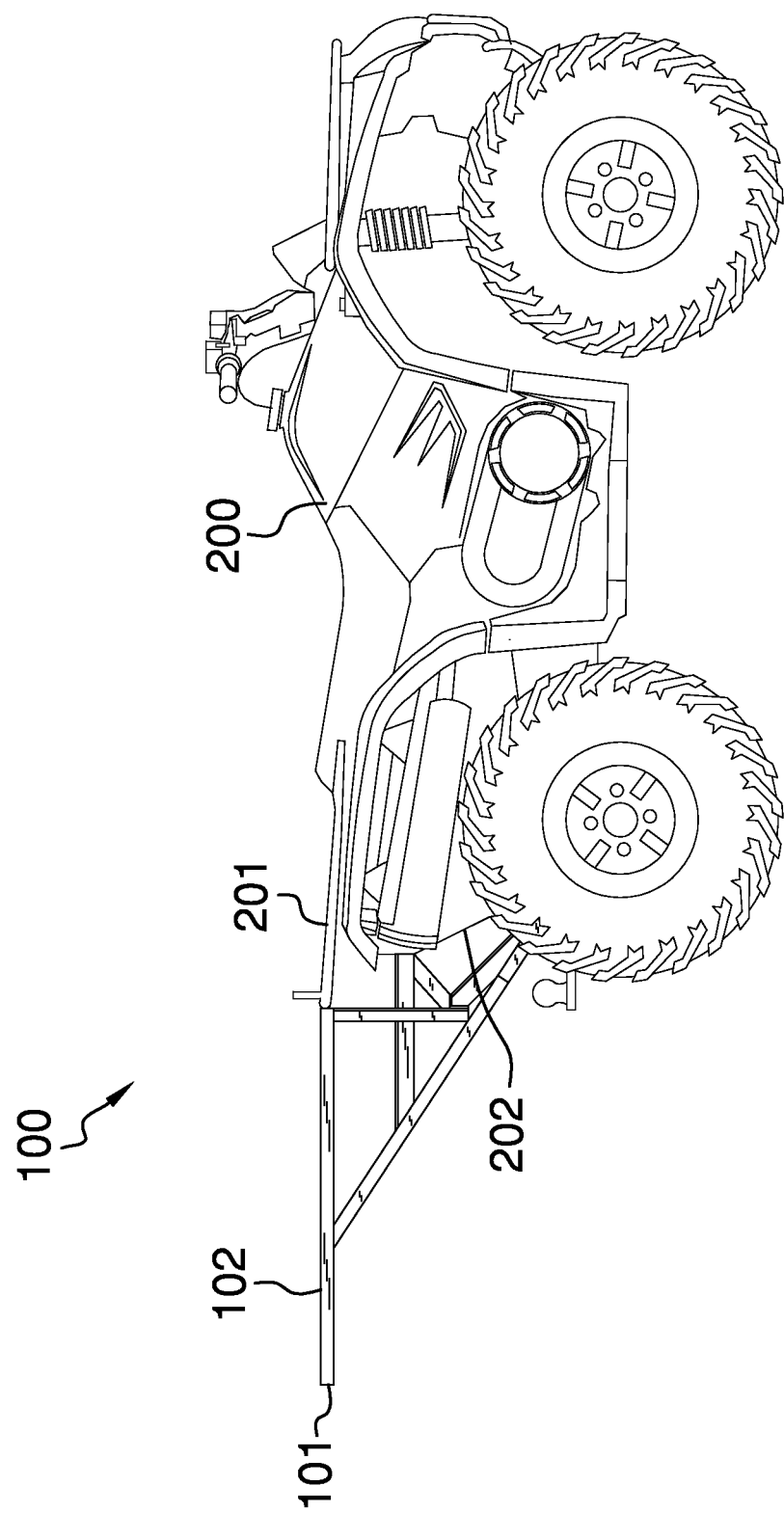
FIG. 5 is a side view of an embodiment of the disclosure in use.

Detailed reference will now be made to a first potential embodiment of the disclosure, which is illustrated in FIGS. 1 through 5. The ATV and four-wheeler rack extension 100 (hereinafter invention) comprises a rack extension frame 101 that is generally rectangular, and is covered with a grate member 102. Both the rack extension frame 101 and the grate member 102 are adapted to be positioned to a rear of a vehicle 200. It shall be noted that the term vehicle 200 is being used to refer to ATVs and four-wheelers. Moreover, the rack extension frame 101 and the grate member 102 are adapted to be aligned to a rear of a rack 201 of said vehicle 200. It shall be noted that the grate member 102 is positioned atop of the rack extension frame 101. The grate member 102 is adapted to be aligned with the rack 201 of the vehicle 200.

The grate member 102 may be made of a metal. The rack extension frame 101 is further defined with a perimeter frame member 103 that includes a plurality of lateral frame members 104 extending across. The perimeter frame member 103 may be further defined with a rear frame member 105. The rear frame member 105 is perpendicularly-oriented with respect to the lateral frame members 104.

A pair of vertical rack members 106 is affixed to the rear frame member 105. Moreover, the pair of vertical rack members 106 extends downwardly from the rear frame member 105. The pair of vertical rack members 106 is each defined with a first distal end 107. A lateral rack member 108 is rigidly affixed to the pair of vertical rack members 106 at the first distal end 107.

A pair of first diagonal members 109 is affixed to two of the plurality of lateral frame members 104. Moreover, the pair of first diagonal members 109 extend downwardly at a first angle 110 from the rack extension frame 101. The pair of first diagonal members 109 are further defined with a second distal end 111. The pair of first diagonal members 109 extend behind the rack extension frame 101. The second distal end 111 of the pair of first diagonal members 109 is rigidly affixed to one of a pair of second diagonal members 112.

The pair of second diagonal members 112 are further defined with a third distal end 113. The third distal end 113 of the pair of second diagonal members 112 is rigidly affixed to the lateral rack member 108. The pair of second diagonal members 112 is further defined with a fourth distal end 114. The fourth distal end 114 of the pair of second diagonal members 112 includes a first hole 115 thereon.

A pair of horizontal members 116 is rigidly affixed to the pair of first diagonal members 109 as well as a pair of third diagonal members 117. The pair of third diagonal members 117 extend rearwardly from the lateral rack member 108. The pair of third diagonal members 117 is further defined with a fifth distal end 118. The fifth distal end 118 of the pair of third diagonal members 117 includes a second hole 119.

The first hole 115 of the pair of second diagonal members 112 as well as the second hole 119 of the pair of third diagonal members 117 are adapted to be secured to a vehicle frame 202 of the vehicle 200. Moreover, fasteners 120 are used to secure the invention 100 to the vehicle frame 202. It shall be noted that the term fasteners 120 is being used to loosely refer to welding, bolts, screws, rivets, etc.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An ATV and four-wheeler rack extension comprising:
a rack extension frame that is adapted to be positioned adjacent to a rack of a vehicle in order to extend a useful area of said rack;
wherein the rack extension frame that is generally rectangular, and is covered with a grate member;
wherein both the rack extension frame and the grate member are adapted to be positioned to a rear of said vehicle;
wherein the rack extension frame and the grate member are adapted to be aligned to a rear of a rack of said vehicle;
wherein the grate member is positioned atop of the rack extension frame;
wherein the rack extension frame is further defined with a perimeter frame member that includes a plurality of lateral frame members extending across;
wherein the perimeter frame member is further defined with a rear frame member;
wherein the rear frame member is perpendicularly-oriented with respect to the lateral frame members;
wherein a pair of vertical rack members is affixed to the rear frame member;
wherein the pair of vertical rack members extends downwardly from the rear frame member;
wherein the pair of vertical rack members is each defined with a first distal end;
wherein a lateral rack member is rigidly affixed to the pair of vertical rack members at the first distal end;
wherein a pair of first diagonal members is affixed to two of the plurality of lateral frame members;
wherein the pair of first diagonal members extend downwardly at a first angle from the rack extension frame;
wherein the pair of first diagonal members is further defined with a second distal end;
wherein the pair of first diagonal members extend behind the rack extension frame;
wherein the second distal end of the pair of first diagonal members is rigidly affixed to one of a pair of second diagonal members;
wherein the pair of second diagonal members are further defined with a third distal end;
wherein the third distal end of the pair of second diagonal members is rigidly affixed to the the lateral rack member; and wherein a pair of horizontal members is rigidly affixed to the pair of first diagonal members as well as a pair of third diagonal members; wherein the pair of third diagonal members extend rearwardly from the lateral rack member.

2. The ATV and four-wheeler rack extension according to claim 1 wherein the pair of second diagonal members is further defined with a fourth distal end; wherein the fourth distal end of the pair of second diagonal members includes a first hole thereon.

3. The ATV and four-wheeler rack extension according to claim 1 wherein the pair of third diagonal members is further defined with a fifth distal end; wherein the fifth distal end of the pair of third diagonal members includes a second hole.

4. The ATV and four-wheeler rack extension according to claim 3 wherein the first hole of the pair of second diagonal members as well as the second hole of the pair of third diagonal members are adapted to be secured to a vehicle frame of the vehicle.

5. The ATV and four-wheeler rack extension according to claim 4 wherein fasteners are used to secure the pair of second diagonal members and the pair of third diagonal members to the vehicle frame of the vehicle.

* * * * *